(12) United States Patent
Burnett et al.

(10) Patent No.: US 6,368,046 B1
(45) Date of Patent: Apr. 9, 2002

(54) MODULATION OF EJECTOR PUMPS TO PROVIDE UNIFORM AND CONTROLLABLE EJECTOR SPEED DURING EJECTOR STROKE FOR ARTICULATED TRUCKS AND THE LIKE HAVING EJECTOR TYPE DUMP MECHANISM

(75) Inventors: Steven Burnett, Durham (GB); Peter F. Prillinger, Dunlap, IL (US); David A. Young, Sunderland (GB)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 09/273,187

(22) Filed: Mar. 19, 1999

(51) Int. Cl.[7] .................................................. B60P 1/00
(52) U.S. Cl. ............................. 414/517; 91/519; 92/62; 414/525.6; 100/273; 239/677
(58) Field of Search .................................. 414/509, 510, 414/511, 513, 516, 517, 518, 525.6; 100/218, 273; 239/677; 198/747; 91/519; 37/431

(56) References Cited

U.S. PATENT DOCUMENTS

| 2,353,120 | A | * | 7/1944 | Austin ........................ 92/62 X |
| 3,952,432 | A | * | 4/1976 | Boersma .................... 91/519 X |
| 4,057,010 | A | * | 11/1977 | Smith ................... 414/525.6 X |
| 4,522,551 | A | * | 6/1985 | Henneberry ................. 414/517 |

* cited by examiner

*Primary Examiner*—Frank E. Werner
(74) *Attorney, Agent, or Firm*—Wood, Herron & Evans; James R. Smith; John J. Cheek

(57) ABSTRACT

A material eject system includes an ejector mounted to a bed of a vehicle which is movable between a rear end and a forward end of the bed for ejecting material from the bed. The ejector is powered by a cylinder having different fluid volumes depending on the direction of motion of the cylinder. A control circuit operates with the ejector motor to automatically move the ejector through eject and return cycles. Further, the control circuit detects different positions of the cylinder and automatically operates the cylinder at different speeds to maintain a constant motor and ejector speed throughout the material eject cycle.

10 Claims, 5 Drawing Sheets

MODULATION OF EJECTOR PUMPS TO PROVIDE UNIFORM AND CONTROLLABLE EJECTOR SPEED DURING EJECTOR STROKE FOR ARTICULATED TRUCKS AND THE LIKE HAVING EJECTOR TYPE DUMP MECHANISM

TECHNICAL FIELD

The present invention relates generally to articulated trucks and more particularly, to articulated trucks having a bed for carrying material therein.

BACKGROUND OF THE INVENTION

Dump trucks have long been known in the art, for use in carrying different types of loads. One such use is in the construction industry for carrying dirt or other construction materials in the dump truck bed. A typical dump truck bed includes a tailgate defining a rear wall of the truck bed. The tailgate retains the material within the bed when the tailgate is in a storage or raised position and permits material to be ejected from the bed as the dump truck bed is raised. U.S. Pat. No. 5,456,521, assigned to the assignee of the present invention, discloses an unloading gate for a dump truck wherein the gate is mounted to one or more rails disposed on the bottom surface of the bed. The unloading gate moves from one end of the bed to the other to scrape and clean the bed after unloading or dumping of the material. The unloading gate in this patent is utilized in conjunction with a conventional dump truck bed which lifts at its forward end closest to the tractor cab and utilizes gravity to dump the material from the dump truck bed.

Applicant has had under development a new material carrying vehicle with a new material ejection system as is described in U.S. patent application Ser. No. 09/160,698, filed Sep. 25, 1998, now U.S. Pat. No. 6,155,776 entitled 'Hydraulic System For a Work Machine Having an Ejector Cylinder and a Tailgate Cylinder', assigned to the assignee of the present invention, which is hereby incorporated in its entirety herein. A variation of the above system is disclosed in U.S. patent application Ser. No. 08/936,128, filed Sep. 24, 1997, now abandoned entitled 'Tailgate Latching Mechanism', assigned to the assignee of the present invention, and hereby incorporated in its entirety herein.

Such a material eject system has a motor, for example, a hydraulic cylinder, that is connected to an ejector blade having a home position at the front end of the bed. To initiate a material eject operation, the motor moves the ejector blade toward the rear of the vehicle, thereby pushing the material in the bed off of the rear edge of the bed. The ejector blade is then retracted or returned to its home position at the front of the bed. The bed normally includes a tailgate which prevents material from exiting the bed while the material is being transported. During the material eject cycle, the tailgate is moved between its closed and open positions in synchronization with the operation of the ejector blade.

A vehicle having a material eject system has several advantages over traditional dump trucks. For example, the vehicle bed is not raised; and its center of gravity is not elevated as the material is being ejected. Therefore, vehicle stability is not adversely affected by the material ejection process. By maintaining a lower center of gravity, a material ejection system is more suitable for controlled spreading of the material during the ejection process. Further, by not raising the bed, the vehicle is not exposed to overhead obstacles such as trees and power lines. In addition, the profile of the ejector blade closely matches the cross-sectional profile of the bed and therefore, substantially all of the material in the bed is scraped out of the bed during the ejection process. Thus, a vehicle material ejection system is generally more efficient and flexible than the traditional elevating material dumping systems.

The motor driving the ejector blade is normally a hydraulic motor, for example, a multistage cylinder, that is supplied hydraulic fluid by a constant or fixed displacement pump being driven by the vehicle engine. Thus, the pump is supplying a fixed flow rate of fluid to the cylinder over the material eject cycle. The multistage cylinder is comprised of a plurality, for example, four nested telescoping cylinders of successively smaller diameters. During the material eject cycle, the hydraulic fluid is supplied to the largest cylinder segment which has the greatest volume. When that cylinder segment reaches the end of its stroke, the hydraulic fluid is supplied to a second smaller cylinder segment which has a smaller volume. Thus, the constant displacement pump will fill the second smaller cylinder segment in less time than it took to fill the first larger cylinder segment; and the second cylinder segment will extend at a faster speed than the first larger cylinder segment. That process continues with the extension of each successively smaller cylinder segment until the cylinder is fully extended. With each successively smaller cylinder segment, the smaller cylinder volume produces a greater speed of extension. Thus, as the ejector blade moves through the material eject cycle, the velocity of the ejector blade continuously increases. That increasing velocity of the ejector blade increases the rate at which material is ejected from the bed, thereby creating a nonuniformity in how the material is being spread as it is being ejected. Thus, there is a need to drive the ejector blade at a constant velocity throughout the material eject stroke in order to eject the material from the bed at a constant rate.

DISCLOSURE OF THE INVENTION

The present invention overcomes the foregoing and other shortcomings and drawbacks of material ejecting systems and methods of material ejecting heretofore known. While the invention will be described in connection with certain embodiments, it will be understood that the invention is not limited to these embodiments. On the contrary, the invention includes all alternatives, modifications and equivalents as may be included within the spirit and scope of the present invention.

In accordance with one embodiment of the present invention, a material eject system for ejecting material from a bed of a vehicle transporting the material has an ejector mounted to the bed of the vehicle which is movable between a forward end of the bed and a rear end of the bed. A motor is mechanically connected to the ejector and moves the ejector through an ejector stroke to dispense material from the bed. The motor, in response to a constant input, operates at a first speed during a first portion of the ejector stroke and operates at a second speed during a second portion of the ejector stroke. A speed control is operatively connected to the motor and automatically changes the input to the motor to operate the motor at the first speed during the second portion of the ejector stroke. Thus, by maintaining a constant motor speed, the ejector blade speed is moved at a constant velocity throughout the eject stroke and the layer depth of material being ejected is also constant.

Another embodiment of the invention is a method of a method of controlling an operation of a motor mechanically connected to an ejector operatively mounted on a bed of a vehicle. The bed contains material being transported by the vehicle. The method first moves the vehicle at a vehicle speed, and thereafter, simultaneously moves the ejector through an eject stroke at one of a plurality of selectable ejector speeds to eject the material from the bed of the moving vehicle and deposit the material in a layer.

The above and other objects, features and advantages of the present invention will become apparent from the following description and the attached drawings.

BRIEF DESCRIPTION OF THE DRAWINGS

For a better understanding of the present invention, reference may be made to the accompanying drawings in which.

BEST MODE FOR CARRYING OUT THE INVENTION

Figure 1:
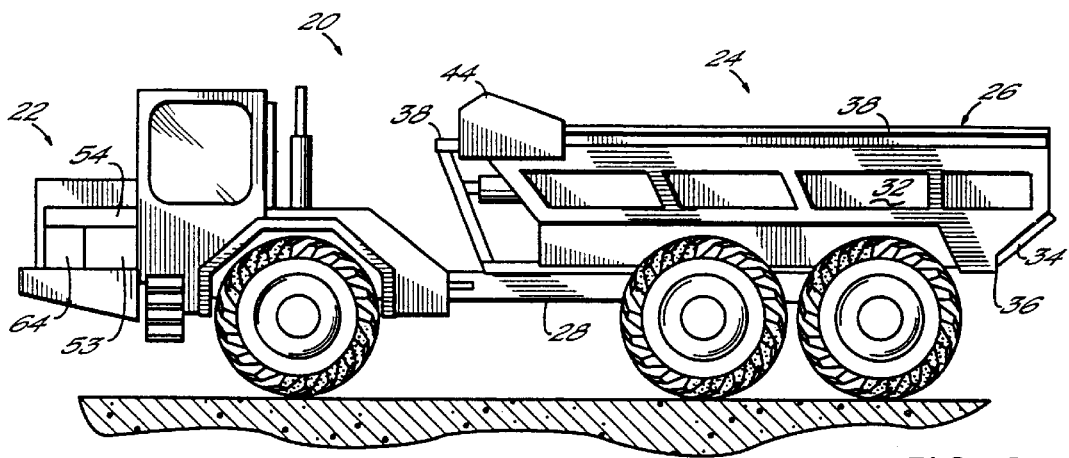
FIG. 1 is a side elevation view of a vehicle including a trailer incorporating an ejector system in accordance with the principles of the present invention.

Referring to FIG. 1, an articulated truck 20 includes a tractor 22 and a trailer 24 having a material carrying bed or receptacle 26 mounted on a frame 28. The bed 26 includes a bottom 30 and a pair of generally upright, spaced apart and parallel side walls 32. The bed 26 further includes a tailgate 34 pivotable at its bottom edge with respect to a rear edge 36 of the bottom 30. One of a pair of guide rails 38 is mounted at the top edge of each of the side walls 32. The guide rails 38 may be integrally formed as part of the side walls 30 or may be separate components, for example, a metal I-beam, attached to the side walls in a known manner.

A material ejection system 40 is disposed within the bed 26 and is slidably movable along the guide rails 38 between the side walls 32. The ejection system 40 includes an ejector in the form of a blade or plate 42 forming a forward wall of the bed 26 and extending essentially the entire width of the bed 26 from a position above the side walls 32 to the bottom 30. The ejector blade 42 preferably has a profile substantially matching the cross-sectional profile of the bed 26. The ejector blade 42 includes a pair of guide member assemblies 44 that include guide rollers for controlling the motion of the ejector blade 42 along the guide rails 38. The ejector blade 42 further rides on one or more support wheels 46 which are normally carried along the bottom edge of the ejector blade 42 and ride on the bottom 30 of the bed 26. The vehicle 20 is configured to carry loads for earth moving operations, for example, loads of dirt, rock, gravel and other similar materials.

Figure 3:
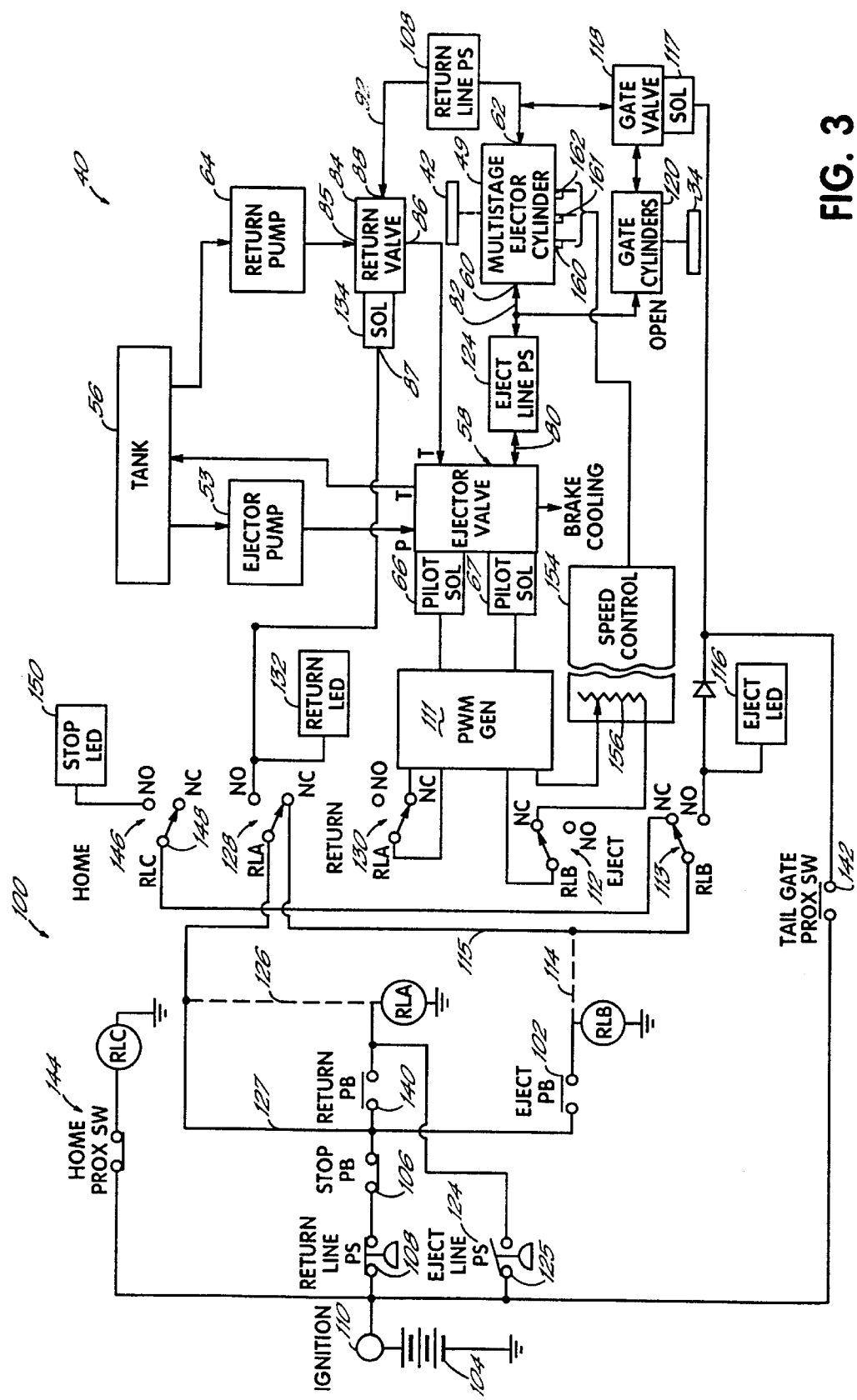
FIG. 3 is a schematic block diagram of an electrical and hydraulic control system for operating the ejector system in accordance with the principles of the present invention.

The material ejection system 40 further includes a drive mechanism or motor 48, for example, a multistage cylinder 49, which is powered by an ejector pump 53 mechanically driven by the vehicle engine 54. As shown in FIG. 3, the ejector pump 53 pumps hydraulic fluid from a fluid source or tank 56 functioning as a reservoir or sump, through an ejector flow control valve, for example, a multiposition selector valve 58, to the multistage ejector cylinder 49. The multistage cylinder 49 is comprised of three cylinder segments 50-52 which operate sequentially. The largest cylinder segment 50 is rigidly connected to the back of the ejector blade 42, and the rod 57 from the smallest cylinder segment 52 is pivotally connected to a frame member adjacent the front of the bed 26.

Figure 2:
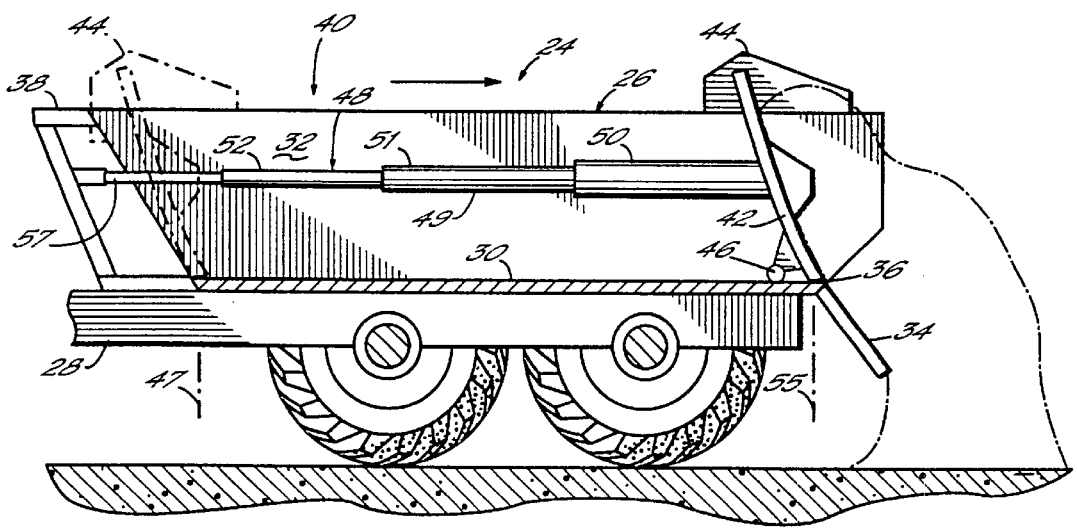
FIG. 2 is a partial cross-sectional elevation of the trailer illustrating the operation of the ejector system in accordance with the principles of the present invention.

Referring to FIGS. 2 and 3, the ejector blade 42 is initially at its home position 47 as shown in phantom in FIG. 2. The ejector pump 53 is a fixed displacement, high capacity pump that pumps hydraulic fluid or oil into the larger, full end port 60 of the largest segment 50 of the multistage cylinder 49. The largest segment has the largest capacity to accept hydraulic oil and extends fully prior to the smaller, intermediate cylinder segment 51 beginning to operate. After the intermediate cylinder segment 51 is fully extended, the smallest cylinder segment 52 begins to extend. When the three cylinder segments 50–52 are fully extended, the ejector blade 42 has been moved from its home position 47 at the front end of the bed 26 to its fully extended position 55 at the rear end 36 of the bed 26. To return the ejector blade 42, hydraulic fluid is introduced into the smaller, annular end port 62 in the smallest cylinder segment 52 to collapse the cylinder 49 back to its unextended or retracted configuration.

The volume of fluid necessary to fully return the ejector blade 42 is up to an order of magnitude less than the volume of fluid used to extend the cylinder. Using the ejector pump 53 to retract the cylinder may overwork the cylinder seals and heat the oil being exhausted from the full end port 60. That cylinder operation is inefficient and potentially damaging to the cylinder. To alleviate that problem, the material ejection system 40 includes a second, return pump 64 also driven by the vehicle engine 54. The return pump 64 is a substantially smaller pump and has a smaller flow rate, for example, 16 cc/min, than the ejector pump which, for example, has a flow rate of 160 cc/min. Therefore, with the present invention, the ejector pump 53 supplies fluid to the high volume, larger end port 60, and the return pump 64 is used to supply fluid to the low volume, smaller, annular end port 62 to power motion of the ejector blade 42 during its return cycle or stroke.

Figure 4:
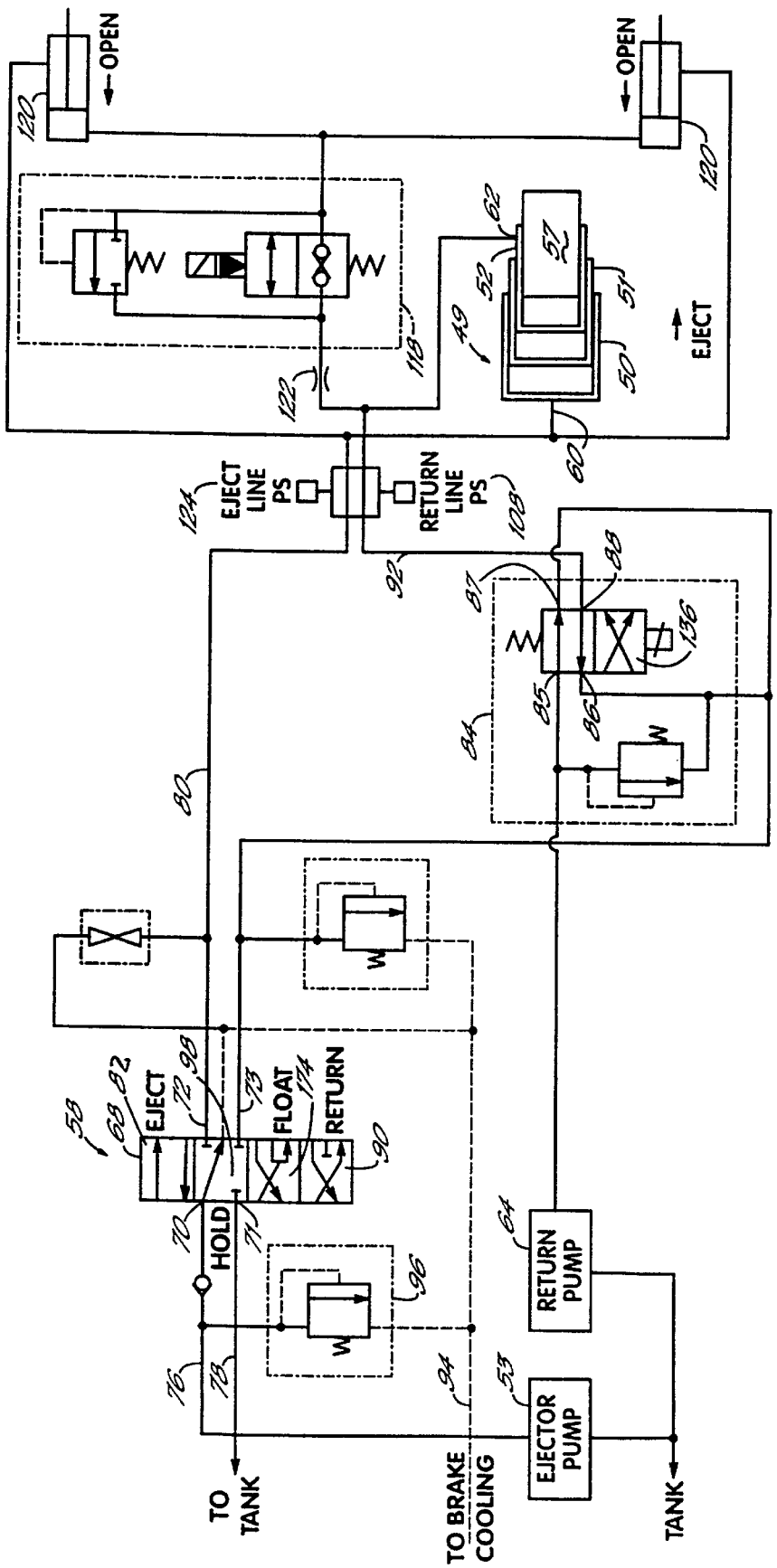
FIG. 4 is a schematic block diagram of further details of the hydraulic control system illustrated in FIG. 3.

Referring to FIGS. 3 and 4, the ejector valve 58 is operated by pilot solenoids 66, 67 which provide hydraulic fluid at pilot pressures to move the main valve spool 68 to one of four stages or states representing different flows of hydraulic fluid through the valve 58. The ejector valve 58 is a known four 'stage' valve commercially available from Caterpillar Belgium SA, located at Gosselies, Belgium, as part number 139-5823, directly pertaining to a control valve Gp. Alternatively, other four 'stage' valves, or four position valves, are commercially available from other vendors and may require actuation by associated solenoids. The ejector valve 58 has a first pressure port 70 connected to an output of the ejector pump 53 via pressure line 76 and a second port 71 connected to the tank 56 via tank line 78. The ejector valve 58 further has a third port 72 connected to an eject pressure line 80 that in turn is connected to the larger end port 60 on the cylinder 49. A fourth port 73 is connected to the smaller end port 62 via the return valve 84. Upon the pilot solenoids 66, 67 receiving a command to initiate a material eject cycle or stroke, the valve 58 moves an eject stage 82 of the spool 68 in to fluid communication with the pressure and tank lines 76, 78, respectively. Thus, high pressure hydraulic fluid passes through first and third ports 70, 72 of the ejector valve 58, through line 82 and into the port 60 of the multistage cylinder 58. As the cylinder 58 extends to move the ejector blade 42 toward the rear end 36 of the bed 26, hydraulic oil is discharged from the cylinder smaller end port 62. The oil then returns to the tank 56 via a return valve 84 and ports 73, 71 of the ejector valve 58.

The return valve 84 is a two stage valve that facilitates the use of the return pump 64 and has a first pressure port 85 connected to an output of the return pump 64 and a second port 86 connected to the tank 56 via the ejector valve 58. The return valve further has a third port 87 tied to the port 86 and a fourth port 88 connected to the smaller port 62 of the cylinder 58. During the eject cycle, the return valve directs the output from the return pump 64 to tank via ports 73, 71 of the ejector valve 58.

Upon receiving a command to initiate a return stroke, the pilot solenoids 66, 67 switch the spool 68 of the ejector valve 58 to connect the return stage 90 to the fluid pressure and tank fluid paths 76, 78. That action disconnects the pressure line 76 from the ejector pump 53 from the cylinder port 60. In addition, the return valve 84 is energized, thereby placing the return pump 66 into fluid communication with the ejector cylinder 50. The return pump 60 having a smaller fixed displacement than the ejector pump 53, provides hydraulic fluid through the return valve 84 via the first and fourth ports 85, 88, respectively, through the return pressure line 92 to the cylinder smaller volume port 62. As the multistage cylinder 58 returns to its retracted position, hydraulic oil is discharged from the larger volume port 60 through the line 80 and back to tank 56 via the respective third and second ports 72, 71 of the ejector valve 58. The smaller displacement return pump 64 better matches the capability of the smallest cylinder segment 52 to receive the hydraulic fluid and not overwork the cylinder. Thus, the ejector blade 42 is reliably moved through the return stroke to its home position 47.

While the material ejection system 40 may be operated manually to initiate the material eject and return cycles of the ejector blade 42, it is preferable that the ejection mechanism 40 after initiation of an eject cycle provide a fully automatic cycle to move the ejector blade 42 from the home position 47 to the fully extended position 55 and then return back to the home position 47 without operator intervention. The material ejection system 40 includes a control circuit 100 (FIG. 3) that effectively provides the desired automatic cycle of operation of the ejector blade 42.

When power is initially applied to the control system 100 by activating an ignition switch 110, inputs to a pulse width modulator ('PWM') generator 111 reset the PWM generator 111 to its default state. In its default state, the PWM generator 111 provides outputs to the ejector valve 58 commanding the pilot solenoids 66, 67 to move the hold stage 98 of the spool 68 in fluid communication with the pressure and tank lines 76, 78, respectively. In the hold stage, the output ports 72, 73 are blocked, thereby blocking the flow of hydraulic fluid to and from the ejector cylinder 49 and blocking the ejector cylinder in its present position, for example, the home position. Hydraulic fluid from the ejector pump 53 is dumped to a brake cooling line 94 via a pressure regulator 96 within the ejector valve 58.

An eject push button 102 is connected to the vehicle battery 104 via normally closed contacts of a stop push button 106, normally closed contacts of a return line fluid pressure sensor or switch 108 and ignition switch 110. Upon the operator depressing the eject push button 102, power is supplied to a relay coil RLB switching the state of the RLB relay contacts 112, 113. Circuitry is provided in a known manner to latch relay coil RLB via latch line 114 to power line 115 from the normally closed contacts 128 of relay RLA. Changing the state of relay contacts 112 changes the input to a pulse width modulator ('PWM') generator 111. The PWM generator 111 then provides output signals to the ejector valve 58 commanding the solenoids 66, 67 to move the eject stage 82 of the spool 68 in fluid communication with the pressure and tank lines 76, 78. With the eject stage 82 of the spool 68 connected to the supply and tank lines 76, 78, the cylinder 49 is driven from its home position 77 toward its fully extended position 55 in a manner as previously described.

Upon the RLB contacts 113 switching state, power is supplied to an eject LED 116 to provide a visual indication that the eject cycle is active. Switching the state of the RLB contacts 113 also energizes the solenoid 117 to switch the state of gate valve 118. High pressure hydraulic fluid is supplied over line 80 to gate cylinders 120. Hydraulic fluid is also discharged from the gate cylinders 120 through the gate valve 118, through flow restrictor 122 (FIG. 4) and back to the tank 56. The flow restrictor 122 regulates the rate at which the cylinders 120 open the gate 34. It is desired that the operation of the gate 34 and the ejection of the material from the bed be coordinated and that the material initially be ejected off of the gate. Therefore, the gate moves at a controlled rate from a closed position to a generally horizontal position in the time it takes the first cylinder segment 50 to fully extend. Material is first ejected from the bed 26 when the gate 34 is at its horizontal position, and thereafter, the gate 34 moves at the same controlled rate until it is fully opened.

When the cylinder 58 moves to its fully extended position 55 (FIG. 2), flow of hydraulic fluid in the eject line 80 ceases and the line pressure rapidly increases. An eject line fluid pressure sensor or switch 124 is set to detect a high eject line pressure that is slightly below the pressure detected by pressure regulator 96 (FIG. 4). When pressure in the eject line 80 reaches the pressure limit of eject line pressure switch 124, the contacts 125 within eject line pressure switch 124 close, thereby energizing relay coil (RLA). Circuitry (not shown) is provided in the known manner to latch relay coil RLA via line 126 to power line 127. Upon the eject line pressure switch 124 energizing coil RLA, coil contacts 128 switch state to remove power from power line 115 and the latch line 113 of relay coil RLB. De-energizing coil RLB switches RLB contacts 112, 113 to their original state, thereby extinguishing the eject LED 116 and switching the input to the PWM generator 111 and the ejector valve 58 to their default states.

Switching of the RLA contacts 128 to their normally opened state illuminates the return LED 132. Further, power is supplied to the solenoid 134 (FIG. 3) of the return valve 84, thereby connecting the return stage 136 with the return valve ports 85-88. Energizing the RLA relay coil further switches the RLA contacts 130 which changes the input state of the PWM generator 111 so that the PWM generator 111 provides signals to the pilot solenoids 66, 90 of the ejector valve 58 to move the return stage 90 of the spool 68 in fluid communication with the pressure and tank lines 76, 78. Thus, in a manner as previously described, the return pump 64 provides hydraulic fluid to the smaller end port 62 of the cylinder 58, thereby moving the cylinder 58 and ejector blade 42 through a return stroke back from the fully extended position 55 toward the home position 47.

As the ejector blade 42 moves toward the home position 55, it passes a tailgate proximity switch 142, thereby causing electrical contacts within the proximity switch to close. The switch 142 is located a sufficient distance from the home position 47 so as to allow the tail gate to close during the remaining return stroke of the ejector blade 42. A distance of approximately 18 inches from the home position has been found to be adequate. Closing the contacts within the switch 142 provides power to the solenoid 117 of the gate valve 118. The pressurized hydraulic fluid in return pressure line 92 passes through the gate valve 118 and into the gate cylinders 120. The restrictor 122 is not operative when the gate 34 is closing; and therefore, the gate moves toward its closed position a full unrestricted speed.

When the cylinder 58 moves to its fully retracted, home position 47 (FIG. 2), flow of hydraulic fluid in the return line 92 ceases and the line pressure rapidly increases. When pressure in the return line 92 reaches the pressure limit of the return line pressure switch 108, the contacts 142 within return line pressure switch 108 open, thereby removing power from line 127 and relay coil RLA latch line 126. Relay coil RLA is thus de-energized, and contacts 128, 130 are switched back to their normally closed states. The PWA generator 111 provides output signals to the ejector valve 58 commanding the pilot solenoids 66, 67 to move the hold stage 98 of the spool 68 in fluid communication with the pressure and tank lines 76, 78, respectively. Hydraulic pressure is blocked at its current state in the cylinders 49, 120, and pressure from the ejector pump 53 is dumped to the brake cooling system through the pressure regulator valve 96. Thus, by the operator pushing the eject PB 102, the ejector blade 42 is moved through a complete material eject cycle by which the ejector blade 44 is first, advanced to the fully extended position 55 at the rear edge 36 of the bed 26 and thereafter, automatically retracted to its home position.

The arrival of the ejector blade 42 at the home position is detected by normally closed contacts of a home position proximity switch 144 changing state. The normally closed contacts within the proximity switch 144 maintain a relay coil RLC energized which maintains the normally open RLC contacts 146 closed. The common terminal 148 of the contacts 146 is connected through the normally closed contacts 113 and the normally closed contacts 128 to the power line 127. Therefore, the stop LED 150 provides a visual indication that the ejector blade 42 is stopped whenever the relay coils RLA and RLB are de-energized. If upon either of the coils RLA, RLB being activated, the stop LED is extinguished. When the ejector blade 42 reaches the home position and opens the contacts of the switch 144, the relay coil RLC is de-eneregized, and the contacts 146 switch to the normally closed state. Thus, the stop LED 150 is inoperable and power is supplied to the suspension switch 152.

The above control circuit 100 includes an obstacle detection capability in that if the ejector blade 42 is moving in the material eject stroke and encounters an obstacle or otherwise jams, the pressure within the eject line 80 will increase until the limit of the eject line pressure switch 124 is reached, thereby closing contacts 125. As previously discussed, closing contacts 125 will automatically switch the direction of motion of the ejector blade 42 and return it to the home position. Similarly, if during the return stroke of the ejector blade 42, an obstacle or jam is encountered, the pressure in the return line 92 will rapidly increase. When the pressure reaches the limit of the return line pressure switch 108, contacts 138 will open, thereby switching the ejector valve 58 to the hold stage and freezing the ejector blade 42 and tailgate 34 in their current positions.

It should also be noted that while the control circuit 100 for the material eject system 40 provides an automatic cycle of operation for the ejector blade 42, the operator at any time may override the automatic cycle. For example, the operator at any time may actuate the return push button 140 which will immediately cause the eject cycle to be terminated and the return cycle to be initiated. Further, the operator at any time may depress the stop push button 106 which removes power from the control, thereby switching the PWM generator 111 and the ejector valve 58 to their default states. The default state activates the hold stage 98 of the spool 68 and freezes the ejector blade 42 and tailgate 34 at their current positions.

As previously mentioned, one advantage of a vehicle with the material ejection system 40 described herein is that the load in the bed may be spread over a large area by driving the vehicle during the material eject cycle. The thickness of the material layer spread will vary with the velocity of the vehicle 20 as well as the velocity of the ejector blade 42. Considering the normally rugged terrain over which the material is being spread, the range of vehicle velocities is strictly limited; and preferably, the vehicle should be driven at a constant speed during the spreading operation. Therefore, the capability of being able to select the speed at which the ejector blade moves is highly desirable. The ejector valve 58 has the capability of moving the spool 68 such that flow is regulated through the ports 70–73. For example, with the eject stage 82 connected to the ports 70–73, the spool position can be further regulated with the pilot solenoids 66, 67 to change the spool position such that the flow paths through the spool 68 are partially blocked. Further, the extent of fluid flow through the valve 58 can be controlled reasonably accurately and repeatably with the pilot solenoids 66, 67. The control circuit 100 further includes a speed control 154 that includes in part a variable resistance 156 that is switched across inputs of the PWM generator 111 upon the RLB contacts 112 being switched to their normally open state. The variable resistance 156 is then used to change the input to the PWM generator 111 which in turn changes the operation of the pilot solenoids 66, 67 to regulate the operation of the ejector valve 58. Thus, the speed control 154 can be used to provide less than full flow rate through the eject stage 82 of the spool 68. Further, the variable resistor 156 can be roughly calibrated to the desired thickness of the layer of material to be spread during the material eject cycle while the vehicle is moving a known constant speed. By providing an operator adjustable speed control, not only is material automatically ejected from the vehicle without operator intervention, but the operator may preselect the desired depth or layer thickness of material to be spread. Further, the entire cycle functions automatically and the attention of the operator can be focused on driving the vehicle.

The fixed displacement ejector pump 53 supplies a fixed flow rate of fluid, and at the beginning of the material eject stroke, the ejector cylinder 49 receives fluid into its largest cylinder segment 50. When the first cylinder segment 50 is fully extended, the second cylinder segment 51 receives the same constant rate of fluid into a smaller volume resulting in a faster speed of extension for the second cylinder segment 51. Thus, the ejector blade 42 is moved at a higher velocity than was provided by the first cylinder segment 50. Similarly, at the end of the stroke of the second cylinder segment 51, the third cylinder segment 52 having an even smaller volume is moved at a higher velocity. Thus, as the ejector cylinder 49 is extended through the ejector stroke, it will be extended at an ever increasing velocity with the activation of each of the successively smaller cylinder segment 51, 52.

In static ejection applications, the variation of velocity of the ejector blade 42 is of no consequence. However, in material spreading applications where the vehicle is moving simultaneously with the eject stroke, variations in the velocity of the ejector blade 42 causes a variation in the thickness of the material being spread. Referring to FIG. 3, the speed control 154 is utilized to modulate the ejector valve 58 and provide different flow rates to the ejector cylinder 49 that account for the smaller piston area with each successive cylinder segment.

To initiate a variation in the flow rate of fluid through the ejector valve 58, the activation of each successive cylinder segment 51, 52 must be detected. That may be done in one of several ways. First, proximity sensors 160–162 may be utilized to detect the end of each piston stroke in each cylinder segment 50–52. The output of the proximity sensors 160–162 is provided to the speed control 154 which provides either a resistance value or a voltage level on the inputs of the pulse with PWM generator 111. The PWM generator then controls the pilot solenoids 66, 67 to position the spool 68 within the ejector valve 58 to provide a flow rate through the ejector valve corresponding to the currently active cylinder segment. In other words, when proximity switch 160 detects that the piston in the largest cylinder segment 50 is at the end of its stroke, the speed regulator 154 provides a new resistance to the PWM generator 111 to slightly change the position of the spool 68. The ejector valve 58 changes the position of the spool 68 to adjust or reduce the flow rate of fluid for the successive smaller cylinder segment 51. The flow through the valve 58 is reduced to cause the piston in the second cylinder segment 51 to move the ejector blade 42 at a velocity approximately equal to the velocity imparted by the previous larger cylinder segment 50. The flow is further reduced when proximity switch detects that the piston in the cylinder segment 51 is at the end of its stroke. Thus, by changing the flow rate through the ejector valve 58, the ejector blade 42 is moved at a constant velocity throughout the material eject stroke. Moving the ejector blade 42 at a constant velocity, greatly enhances the ability of the vehicle to spread a uniform thickness of material during the eject cycle.

Figure 5:
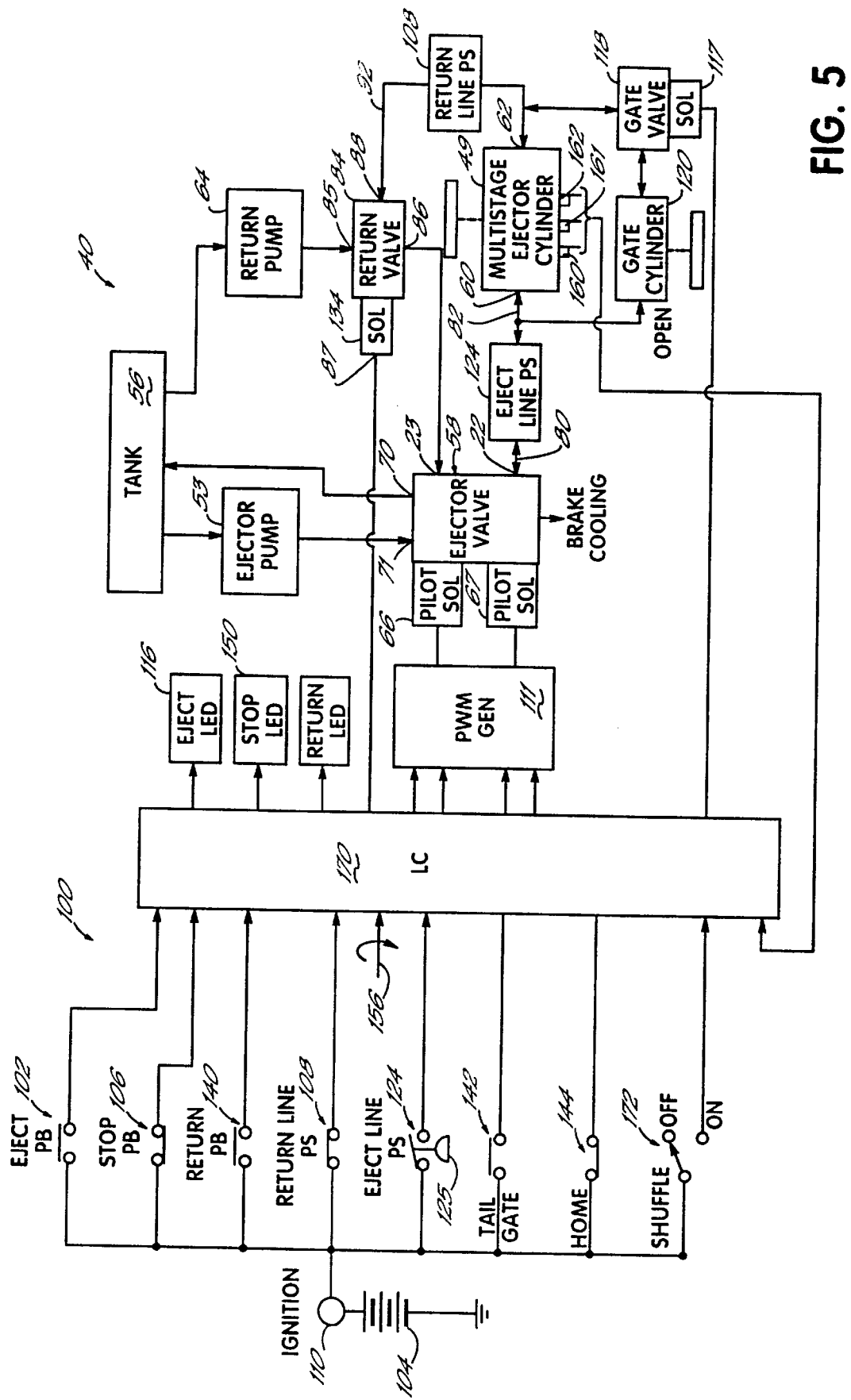
FIG. 5 is a schematic block diagram of an alternative embodiment of the electrical control system illustrated in FIG. 3.

Referring to FIG. 5, an alternative embodiment of the material ejection system 40 is illustrated. Instead of the discreet components described with respect to FIG. 3, the control system 100 of FIG. 5 utilizes a logic controller, for example, a programmable logic controller, 170. In a known manner, the various push buttons 102, 106, 140, proximity switches 142, 144, pressure switches 108, 124 and other components providing input state signals are provided to inputs of the logic controller 170. The logic controller is provided with an internal logic network, preferably a programmable network, such that various sets of output signal states are provided in response to different sets of input signal states.

In certain applications in which the material being ejected is a stickier material, for example, a clay-like material, at the end of the ejection stroke, a bridge of material may form between the side walls 32 of the bed 26 and the ejector blade 42. The bridge of material often simply sticks to and hangs from the ejector blade 42 without dropping from the bed 26. In that event, when the ejector blade returns to the home position, the bridging material is carried back into the bed 26. To alleviate that problem, a shuffle cycle is used in which the ejector blade 42, after reaching the end 55 of the eject stroke, is retracted a short fixed distance into the bed to break the bridge of material. After breaking the bridge of material, the material generally falls to the bottom 30 of the bed; and the ejector blade is switched into the eject cycle to push the material from the bed. Normally, only a single shuffle of the ejector blade 42 is required to dislodge the bridging material. If for some reason the dislodged material causes an obstruction or jam of the ejector blade 42 during the eject portion of the shuffle cycle, the ejector blade 42 will provide a smaller shuffle cycle, that is, retracting a short distance and then switching back to the eject mode. If the obstruction is again encountered, the ejector blade either returns to home or is switched to the hold cycle as previously described.

Figure 6:
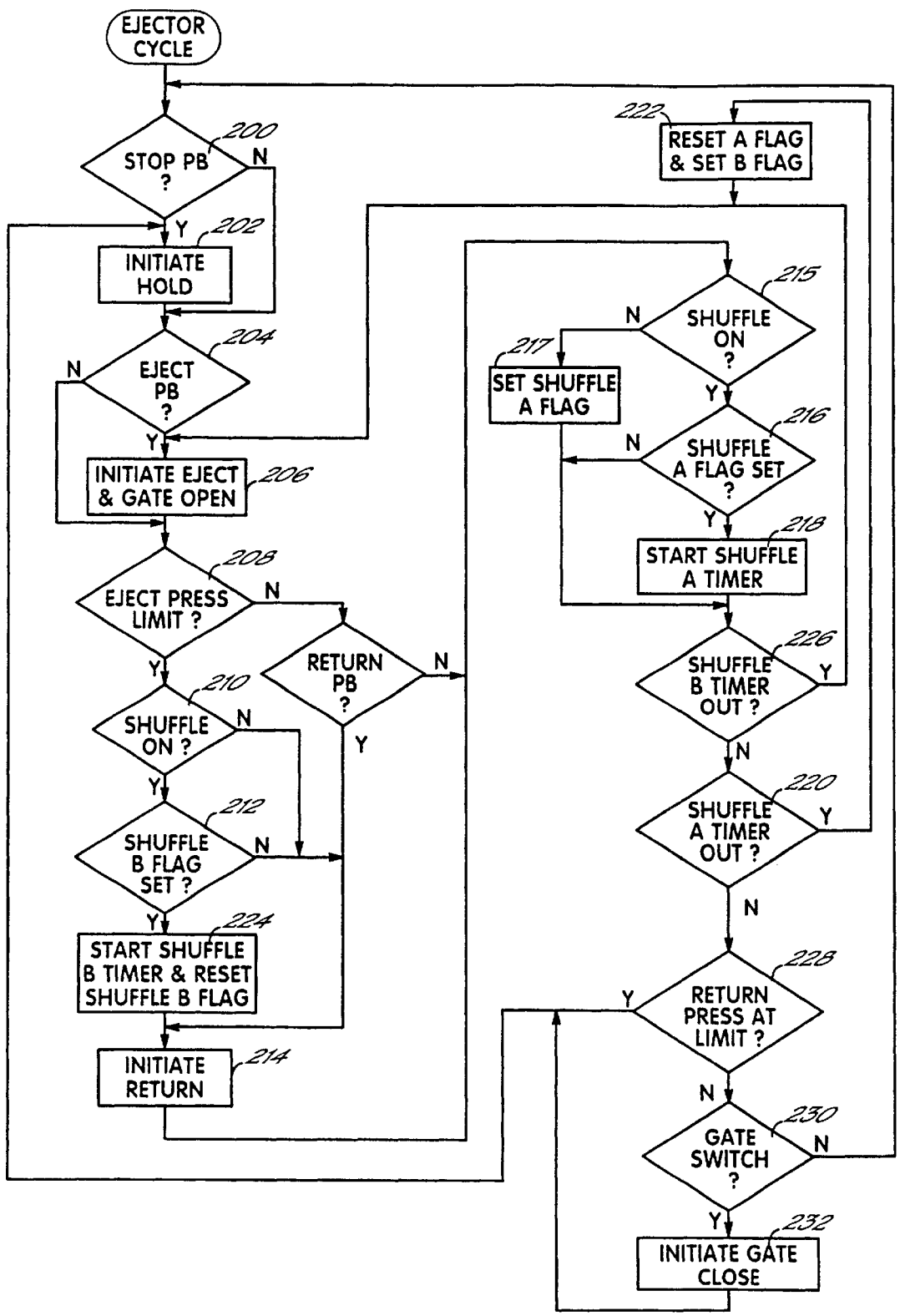
FIG. 6 is a flow chart illustrating the steps of a shuffle cycle implemented with the material eject control system of FIG. 5 in accordance with the principles of the present invention.

Such a shuffle cycle is illustrated in the flow chart of FIG. 6 which represents a material ejection cycle implemented with the logic controller 170 of FIG. 5. If the material being moved is a sticky clay-like material, the operator will have turned on the shuffle switch 172. The material eject cycle begins by detecting at 200 of FIG. 6 the state of the stop push button 106. If the stop push button 106 is pushed, the logic controller 170 provides outputs to the PWM generator 111 to control the pilot solenoid 66, 67 to move the hold stage 98 of the spool 68 in communication with the pressure and tank lines 76, 78. If the stop push button 106 is not depressed, the logic controller 170 then at 204 determines the state of the eject push button 102. If the eject push button 102 has been depressed, the logic controller 170 at 206 initiates the eject and gate open cycles. Again, the PWM generator 111 is providing input signals that cause the pilot solenoid 66, 67 to move the eject stage 82 of the spool 68 of the valve 58 in communication with fluid lines 76, 78, thereby providing fluid to the eject cylinder 49 and moving the ejector blade 42 through the material eject cycle. Simultaneously, the logic controller 170 provides an output signal to solenoid 117 of gate valve 118 which permits the flow of pressurized fluid through the gate cylinders 120 to begin opening the gate 34. During the material eject stroke, the logic controller 170 is continuously checking the state of the pressure switch 124 in the eject line 80. Assuming no obstructions are encountered during the material eject cycle and no other push buttons are actuated, the logic controller 170 continuously moves through the flow chart of FIG. 6 until the eject line pressure switch 124 closes its contacts 125 in response to the ejector cylinder 49 reaching the end of the eject stroke.

The logic controller 170 detects at 208 the eject line pressure switch 124 closing in response to the cylinder 58 reaching the end of its stroke. Further, the logic controller 170 detects at 210 that the shuffle cycle has been activated but further detects at 212 that the shuffle B flag is not set. Thereafter, the logic controller at 214 initiates the return cycle by providing inputs to the PWM generator 111 to control the pilot solenoids 66, 67 to move the return stage 90 of the spool 68 of the ejector valve 58 in fluid communication with pressure and tank lines 76, 78, respectively. The logic controller 170 then again detects that the shuffle cycle is on at 215; and at 216, the controller detects that the shuffle A flag is set. The shuffle A flag was set at 217 by a prior off state of the shuffle switch 172. At 218, the controller 170 starts the shuffle A timer which controls the length of the retraction of the ejector blade during the shuffle cycle. While the shuffle timer is timing, the logic controller continues to move the ejector blade 42 toward the home position testing for whether the return line pressure switch 108 is activated. Assuming no obstruction is encountered, the logic controller at 220 then detects that the shuffle A timer has timed out and at 222 resets the shuffle A flag and sets the B flag. The logic controller then at 206 again initiates the eject cycle, thereby reversing the motion of the ejector blade 42 after a short return stroke determined by the length of timer A.

Presumably, during the retract cycle, any bridge of sticky material between the ejector blade 42 and side walls 32 of the bed 36 has been broken; and the material has dropped to the bottom 30 of the bed 26. Thus, during the eject stroke, the bridging material is pushed by the ejector blade 42 from the bed. When the logic controller 170 detects at 208 that an eject pressure limit has been reached, the eject pressure limit may be caused either by the ejector blade 42 achieving the end of the ejection cycle or the ejector blade 42 encountering an obstruction. The logic controller 170 detects at 210 that the shuffle cycle is on and, at 212, that the shuffle B flag is set. Thereafter, at 224, the logic controller then starts the shuffle B timer and resets the shuffle B flag. The logic controller at 214 initiates a return cycle, and the ejector blade 42 retracts a short distance for a period of time determined by the length of the shuffle B timer. When the logic controller at 226 detects the shuffle B timer has expired, the eject cycle is again initiated at 206. At this time, all of the shuffle flags have been reset; and therefore, when the eject line pressure switch detects the pressure limit, the logic controller 170 initiates a return of the ejector blade 42 back to the home position.

If the logic controller 170 at 228 detects the return line pressure switch sensing a pressure limit, the PWM generator 111 commands the pilot solenoid 66, 67 to move the ejector valve to the hold stage. If no obstruction is detected by the return line pressure switch, the logic controller 170 at 230 detects when the ejector blade 42 moves past the tailgate proximity switch 142. At that point, the logic controller 170 initiates at 232 a gate closing cycle by providing an output to the solenoid 117 of the gate valve 118, thereby permitting the pressurized fluid to move through the gate cylinders 120 in a direction causing the gate 34 to close. When the ejector blade 42 reaches the home position, the return line pressure switch again produces a pressure limit signal which is detected at 228 by the logic controller 170; and thereafter, the logic controller 170 at 202 initiates the hold cycle.

While not specifically shown, it will be appreciated that other constructions of the material eject system may be used without departing from the spirit and scope of the present invention. For example, in the disclosed embodiment, the operation of the material eject mechanism 40 is initiated by push buttons and other switches. As will be appreciated other types of operator controls may be utilized such as joysticks, levers, remote controls, etc. Further, the operation of the different cylinder segments 50–52 are detected by proximity switches 160–162. As the multistage cylinder 49 shifts from one cylinder element to another, for example, from cylinder segment 50 to cylinder segment 51, the hydraulic pressure in the eject pressure line 80 experiences a rapid change. That rapid change can be detected by other pressure switches or by a pressure sensor providing an input to the logic controller 170. Upon detecting the changes in pressure representing a transition between the cylinder segments, command signals can be provided to the pilot solenoid 66, 67 to modulate the ejector valve 58 and provide a different flow rate to the ejector cylinder 50. Thus, the detection of variations in pressure in the eject line 80 can be used instead of the proximity switches 160–162 to detect operational transitions between the cylinder segments 50–52. Further, the multistage cylinder speed control described herein may be used with such cylinders in other applications than the one disclosed herein.

As will be appreciated, in a further alternative embodiment, the constant displacement ejector pump 53 can be replaced by a variable displacement pump. The flow rate from the pump can be controlled to match the difference in flows associated with the various cylinder segments 50–52 in order to move the ejector blade 42 at a constant speed throughout the material eject cycle. Alternatively, in static eject applications where the material is not being spread, the speed control 154 can be disabled, so that the ejector blade moves through the eject stroke at the greatest possible speed, thereby providing the shortest possible and most efficient material eject cycle.

In a further embodiment, the motor 48 for the ejector blade 42 may be a hybrid combination of electric and hydraulic motors.

INDUSTRIAL APPLICABILITY

With reference to the drawings and in operation, the material ejection control system 40 utilizes two pumps: a large capacity pump 53 to extend the cylinder 49 in a material eject cycle, and a substantially smaller capacity pump 64 to retract the cylinder in an ejector blade return cycle. The smaller pump 64 provides a fluid supply that better matches the relatively small volume fluid required to retract the cylinder. Thus, the ejector return cycle operates more reliably.

The material ejection system 40 includes control circuitry 100 for automatically controlling a full material ejection process which includes both a material eject stroke and a return stroke of the ejector blade 42. The automated material ejection process has several advantages. First, it permits the operator to concentrate on driving the vehicle while the material ejection process is being executed. Second, it prevents the ejector blade 42 from being left in a position close to but not at the home position. If the blade 42 is not fully retracted, material being loaded can be dumped forward of the ejector blade 42 onto the ejector motor 48 during a material loading process. Dumping material on the ejector motor 48 and associated system components exposes those components to damage.

The automatic ejection cycle is also sensitive to the ejector blade 42 contacting obstacles and becoming jammed in either the eject cycle or the return cycle. If an obstruction is encountered in the eject cycle, the ejector blade 42 returns to the home position. If an obstruction is encountered in the return cycle, the ejector blade 42 is stopped. Thus, with the automatic cycle, the ejector motor 48 is protected from repetitive attempts to clear an obstruction which may lead to overheating and damage to the ejector motor 48.

The vehicle ejection system 40 has the advantage of being able to eject material from the bed while the vehicle is moving without jeopardizing the stability of the vehicle 20. Further, since the ejector blade 42 is motor driven, the ejection of material is a reliable continuous, uniform and generally repeatable operation. The control circuit 100 of the material ejection system 40 includes a speed control 154 that permits the operator to select different speeds for the ejector blade 42. By moving the ejector blade 42 at different speeds, if the vehicle is operating at a constant speed, material can be ejected from the vehicle and spread in layers of uniform but different thicknesses. Thus, the present invention has the advantage of permitting the operator to select a desired thickness for a layer of material to be spread, initiate a material eject cycle and then fully concentrate on driving the vehicle 20 at a fixed speed knowing the material will be automatically ejected at the desired rate to achieve the desired layer thickness.

The disclosed multistage cylinder 49 moves the ejector blade 42 by successively operating successively smaller cylinder segments 50–52. Those successively smaller cylinder segments 50–52 present respective successively smaller cylinder volumes to the fixed displacement ejector pump 53. Thus, with a constant displacement pump, each successive cylinder segment 50–52 will move the ejector blade 42 at respective successively increasing speeds. The control circuit 100 detects operating transitions between the successive cylinder segments 50–52 and modulates the ejector valve 58 so that hydraulic fluid is supplied to the cylinder 49 at successively smaller flow rates. Consequently, the operation of each cylinder segment 50–52 is adjusted so that the ejector blade 42 moves at a constant speed throughout the material eject cycle. Thus, the speed of the ejector blade 42 is controlled and maintained constant in order to eject the material at a constant rate and maintain a uniform layer thickness as the material is being spread from the moving vehicle 20.

The control 100 further includes a shuffle cycle switch 172 which is directed to ejecting any material that sticks between the ejector blade 42 and the side walls 32 at the extended position 55 of the ejector blade 42. When turned on, the shuffle cycle moves the ejector blade 42 through a small return stroke in order to break the bridging material and then after, through a subsequent eject stroke to push the material from the bed 26. If in the shuffle ejection stroke an obstruction is encountered, the ejector blade 42 will again retract a small distance and once again move into a material eject cycle to either clear the obstruction or eject the bridging material. Thus, the control circuit 100 permits the operator to automatically operate the ejector blade 42 in a manner fully ejecting sticky materials that may be loaded into the bed 26.

It should be noted that the ejector valve 58 has a float stage 174 that may be moved into fluid communication with the pressure and tank lines 76, 78, respectively. With the ejector valve 58 switched to the float mode, the ports 60, 62 of the ejector cylinder 49 are opened to the tank 26. This permits the ejector blade 42 to be mechanically moved without the application of hydraulic pressure for maintenance or other purposes.

Other aspects, objects and advantages of the present invention can be obtained from a study of the drawings, the disclosure and the appended claims.

What is claimed is:

1. A material eject system for ejecting material from a receptacle of a vehicle transporting the material, the material eject system comprising:
   an ejector operatively associated with the receptacle of the vehicle and movable between a forward end of the receptacle and a rear end of the receptacle;
   a motor, mechanically connecting the ejector to the receptacle, for moving the ejector through an eject stroke to dispense material from the receptacle, the motor, in response to a constant input, operating at a first speed during a first portion of the eject stroke and a second speed during a second portion of the eject stroke; and
   a speed control operatively connected to the motor and configured to automatically change the input to the motor to operate the motor at the first speed during the second portion of the eject stroke.

2. The material eject system as set forth in claim 1 wherein said motor comprises a multistage hydraulic cylinder.

3. The material eject system as set forth in claim 1 further comprising at least one sensor (i) configured to sense a transition between the first portion and the second portion, (ii) generate a signal responsive to the transition, and (iii) relay the signal to the speed control.

4. The material eject system as set forth in claim 1 wherein the speed control includes a variable control device for variably controlling the input to the motor.

5. The material eject system as set forth in claim 4 wherein the variable control device comprises a variable resistor.

6. A material eject system for ejecting material from a receptacle of a vehicle transporting the material, the material eject system comprising:
   an ejector operatively associated with the receptacle of the vehicle and movable between a forward end of the receptacle and a rear end of the receptacle;
   a motor, mechanically connecting the ejector to the receptacle, for moving the ejector through an eject stroke to dispense material from the receptacle, the motor, in response to a fixed input, operating at a first speed during a first portion of the eject stroke and operating at a second speed during a second portion of the eject stroke;
   a sensor for sensing the motor moving the ejector from the first portion to the second portion of the eject stroke; and
   a speed control operatively connected to the motor and configured to change the input to the motor in response to the sensor detecting the motor moving the ejector from the first portion to the second portion of the eject stroke to operate the motor at the first speed in the second portion of the eject stroke.

7. The material eject system as set forth in claim 6 wherein said motor comprises a multistage hydraulic cylinder.

8. The material eject system as set forth in claim 6 wherein the speed control includes a variable control device for variably controlling the input to the motor.

9. The material eject system as set forth in claim 8 wherein the variable control device comprises a variable resistor.

10. A material eject system for ejecting material from a receptacle of a vehicle transporting the material, the material eject system comprising:
    an ejector operatively associated with the receptacle of the vehicle and movable between a forward end of the receptacle and a rear end of the receptacle;
    a multistage hydraulic cylinder, mechanically connecting the ejector to the receptacle, for moving the ejector through an eject stroke to dispense material from the receptacle, the multistage hydraulic cylinder, in response to a fixed input, operating at a first speed during a first portion of the eject stroke and operating at a second speed during a second portion of the eject stroke;
    a sensor for sensing the multistage hydraulic cylinder moving the ejector from the first portion to the second portion of the eject stroke and generating a signal in response thereto;
    a pump configured to supply hydraulic fluid to the multistage hydraulic cylinder during the eject stroke;
    a valve situated between the pump and the multistage hydraulic cylinder, the valve having a moveable spool; and
    a signal generating device configured to receive the signal from the sensor and operatively position the spool in response to the signal to operate the motor at the first speed in the second portion of the eject stroke.

* * * * *

UNITED STATES PATENT AND TRADEMARK OFFICE
CERTIFICATE OF CORRECTION

PATENT NO.     : 6,368,046 B1                                                Page 1 of 1
DATED          : April 9, 2002
INVENTOR(S)    : Steven Burnett et al.

It is certified that error appears in the above-identified patent and that said Letters Patent is hereby corrected as shown below:

<u>Title page,</u>
Item [73], please change Assignee designation of "Caterpillar Inc." to
-- Caterpillar S.A.R.L. --

Signed and Sealed this

Seventeenth Day of December, 2002

JAMES E. ROGAN
*Director of the United States Patent and Trademark Office*